(12) United States Patent
Gilstad

(10) Patent No.: US 8,292,260 B1
(45) Date of Patent: Oct. 23, 2012

(54) IMPULSE TOLERANT VALVE ASSEMBLY

(76) Inventor: Dennis W. Gilstad, San Antonio, TX (US)

( * ) Notice: Subject to any disclaimer, the term of this patent is extended or adjusted under 35 U.S.C. 154(b) by 0 days.

(21) Appl. No.: 13/210,407

(22) Filed: Aug. 16, 2011

Related U.S. Application Data

(63) Continuation-in-part of application No. 13/196,916, filed on Aug. 3, 2011.

(51) Int. Cl.
*F16K 31/44* (2006.01)

(52) U.S. Cl. .......... 251/80; 251/120; 251/332; 251/334; 251/367

(58) Field of Classification Search ............ 251/12, 251/48, 77, 80, 120, 332, 334, 318, 356, 251/366–367; 137/516.29
See application file for complete search history.

(56) References Cited

U.S. PATENT DOCUMENTS

| | | | | | |
|---|---|---|---|---|---|
| 1,705,800 | A | * | 3/1929 | Akeyson | 251/332 |
| 1,733,180 | A | * | 10/1929 | Biedermann | 251/120 |
| 2,002,672 | A | * | 5/1935 | Melott | 137/516.29 |
| 2,011,547 | A | * | 8/1935 | Campbell | 137/516.29 |
| 2,298,632 | A | * | 10/1942 | Thorner | 251/319 |
| 2,446,196 | A | * | 8/1948 | Sitney | 137/340 |
| 3,004,633 | A | * | 10/1961 | Hobson | 188/298 |
| 3,540,472 | A | * | 11/1970 | Brady et al. | 137/516.29 |
| 4,088,301 | A | * | 5/1978 | Ehmig | 251/334 |
| 4,254,792 | A | * | 3/1981 | Schadel | 137/240 |
| 4,687,421 | A | * | 8/1987 | Cameron et al. | 417/296 |
| 4,860,995 | A | * | 8/1989 | Rogers | 251/356 |
| 4,951,707 | A | * | 8/1990 | Johnson | 137/516.29 |
| 5,073,096 | A | * | 12/1991 | King et al. | 417/454 |
| 5,088,521 | A | * | 2/1992 | Johnson | 137/516.29 |
| 5,193,577 | A | * | 3/1993 | de Koning | 137/516.29 |
| 5,226,445 | A | * | 7/1993 | Surjaatmadja | 137/516.29 |
| 5,249,600 | A | * | 10/1993 | Blume | 137/516.29 |
| 5,275,204 | A | * | 1/1994 | Rogers et al. | 137/516.29 |
| 5,431,186 | A | * | 7/1995 | Blume | 137/516.29 |
| 5,979,242 | A | | 11/1999 | Hobbs | |
| 6,432,320 | B1 | | 8/2002 | Bonsignore et al. | |
| 7,222,837 | B1 | | 5/2007 | Blume | |
| 7,513,759 | B1 | | 4/2009 | Blume | |
| 7,591,450 | B1 | * | 9/2009 | Blume | 251/332 |
| 7,847,057 | B2 | | 12/2010 | Muller et al. | |
| 2004/0226616 | A1 | * | 11/2004 | Vicars | 137/542 |
| 2008/0279706 | A1 | * | 11/2008 | Gambier et al. | 417/455 |
| 2011/0240064 | A1 | * | 10/2011 | Wales et al. | 134/26 |

* cited by examiner

*Primary Examiner* — John K Fristoe, Jr.
*Assistant Examiner* — Marina Tietjen
(74) *Attorney, Agent, or Firm* — Dennis W. Gilstad

(57) ABSTRACT

An impulse tolerant valve body is longitudinally deformable, acting through its convex valve seat interface and a concave valve seat to beneficially reduce closing energy impulse amplitude, increase impulse duration, damp induced resonance vibrations, and narrow the characteristic vibration spectrum. Elastic longitudinal valve body deformability results from elasticity in valve body construction materials and, in certain embodiments, from at least one fluid-filled internal elastic space in fluid communication with at least one internal surge chamber via at least one fluid flow restrictor. Fluid flow from elastic space to surge chamber allows substantially central longitudinal valve body compression, followed by elastic valve body rebound with reverse fluid flow. Beneficial effects are achieved through dissipation of impulse energy as heat lost through fluid flow friction and valve body hysteresis. The valve body's tendency to deform centrally causes slight rotation of its convex valve seat interface on the correspondingly-curved concave valve seat.

6 Claims, 3 Drawing Sheets

_US 8,292,260 B1_

IMPULSE TOLERANT VALVE ASSEMBLY

This application is a continuation-in-part of copending application Ser. No. 13,196,916, filed 3 Aug. 2011, which is incorporated by reference.

FIELD OF THE INVENTION

The invention relates generally to reciprocating high-pressure pumps, and more specifically to the valves of such pumps.

BACKGROUND

Reciprocating high-pressure pumps, such as those for oil field use, are usually designed in two sections, the (proximal) power section (herein "power end") and the (distal) fluid section (herein "fluid end"). The power end comprises a crankshaft, reduction gears, bearings, connecting rods, crossheads, crosshead extension rods, etc. The fluid end comprises a housing which in turn comprises one or more functional units, each functional unit comprising a suction valve, a discharge valve, and a plunger or piston bore in which a reciprocating plunger or piston alternately produces suction strokes and pressure strokes. See, e.g., U.S. Pat. No. 7,513,759 B1, incorporated by reference.

Suction valves of high pressure oil field pumps experience wide pressure variations between a suction stroke, when the valve opens, and a pressure stroke, when the valve closes. For example, during a pressure stroke a valve body may be driven toward contact with its corresponding valve seat with total valve closing force that may vary from about 50,000 to over 150,000 pounds (depending on pumped fluid pressure and valve body area); the closing force is applied longitudinally to the proximal surface of the valve body. Actual valve closure impact occurs with metal-to-metal contact between the valve body's valve seat interface and the valve seat itself.

Valve closure impact is particularly prominent when a conventionally-stiff valve body contacts a conventional frusto-conical valve seat. The valve body's longitudinal movement typically stops abruptly, together with the associated longitudinal movement of a proximal mass of pressurized fluid in contact with the valve body. The kinetic energy of the moving valve body and pressurized fluid is thus nearly instantly converted to a high-amplitude closing energy impulse of short duration.

A portion of the sharply rising impulse of closing energy is quickly transmitted via the valve seat to adjacent areas of the pump housing in the form of characteristically broadband vibration. And this broadband vibration then induces damaging resonances within the valve as well as within adjacent pump housing structures. See, e.g., U.S. Pat. No. 5,979,242, incorporated by reference. Both rapid valve wear and the early emergence of structurally significant fatigue cracks in the pump housing near the valve seat are commonly seen under these conditions.

Proposed designs valve designs in the past have included relatively lighter valve bodies comprising one or a plurality of interior cavities. See, e.g., U.S. Pat. No. 7,222,837 B1, incorporated by reference, and referred to hereinafter as the '837 patent. Notwithstanding the somewhat lower closing energy impulse amplitudes theoretically associated with such lighter valve bodies, they nevertheless have not found wide industry acceptance. A more effective valve design for reducing pump damage due to closing energy impulse-related vibration is thus needed.

SUMMARY OF THE INVENTION

An impulse tolerant valve assembly comprises an impulse tolerant valve body and a concave valve seat. An impulse tolerant valve body is longitudinally elastically deformable and acts through its longitudinally convex valve seat interface (hereinafter, convex valve seat interface) and a longitudinally concave valve seat (hereinafter, concave valve seat) to beneficially reduce closing energy impulse amplitude, increase impulse duration, damp induced resonance vibrations, and narrow the characteristic vibration spectrum.

Elastic longitudinal valve body deformability results at least in part from elastic properties of materials comprising the valve body (e.g., steel, carbon fiber reinforced polymer, carbon nanotube reinforced polymer, and/or carbon nanotube reinforced metal matrix). The polymer may comprise a polyaryletherketone (PAEK), for example, polyetheretherketone (PEEK). See, e.g., U.S. Pat. No. 7,847,057 B2, incorporated here by reference.

A closing energy impulse acting on an impulse tolerant (suction) valve assembly of the invention causes substantially central longitudinal deformation of the impulse tolerant valve body. Such deformation comprises a concave or bowl-shaped valve body flexure which may be accentuated by centralized valve body compression in certain embodiments as described below. The description of valve body flexure as concave or bowl-shaped refers to a view from the proximal or high-pressure side of the valve body. Such flexure is elastic and is accommodated by slight circular rotation (i.e., a circular rolling contact) of the valve body's convex valve seat interface with the correspondingly-curved concave valve seat. Such rolling contact augments formation of the bowl-shaped valve body flexure on the pump pressure stroke, reversing the process on the suction stroke.

The circular rolling contact described herein may be visualized by considering the behavior of the convex valve seat interface as the valve body experiences bowl-like flexure (i.e., the transformation from a relatively flat shape to a bowl shape). During such flexure the periphery of the valve seat interface rotates inwardly and translates proximally (relative to the valve body's center of gravity) to become the proximal rim of the bowl shape.

While elastic, each such valve body flexure is associated with energy loss from the closing energy impulse in the form of heat due to valve body hysteresis. Further, the associated circular rolling contact of the convex valve seat interface with the concave valve seat minimizes wear that would be associated with sliding contact of these surfaces. And the rolling nature of the contact between valve body and valve seat, during both longitudinal valve body flexure and the elastic rebound which follows, tends to minimize trapping of particulate matter from the pumped fluid between the rolling surfaces.

In addition to the above described valve body flexure, certain valve body embodiments described herein exhibit elastic longitudinal valve body deformability due in part to at least one fluid-filled internal elastic variable-volume space in fluid communication with at least one internal surge chamber via at least one fluid flow restrictor. Fluid flow from a variable-volume space to a surge chamber allows substantially central longitudinal valve body deformation (i.e., compression), followed by elastic valve body rebound with reverse fluid flow. Beneficial effects are achieved in part through partial conversion of closing impulse energy to heat through fluid flow friction, followed by heat dissipation (i.e., energy loss). The valve body's tendency to compress centrally under the influence of a closing energy impulse augments the slight rotation of its convex valve seat interface on the correspondingly-curved concave valve seat as described above.

Another aspect of the formation of a bowl-shaped valve body flexure under the influence of a closing energy impulse is that the momentum of pumped fluid which moves in contact with the valve body is smoothly redirected (at least in part) laterally and proximally by the concave proximal valve body surface. Forces due to oppositely directed radial components of the resultant fluid flow tend to cancel, and energy lost in pumped fluid turbulence is subtracted from that of the closing energy impulse.

Because of the time required for valve body longitudinal flexure to take place, with the associated dissipation of closing impulse energy described above, a closing energy impulse applied to an impulse tolerant valve assembly is relatively lower in amplitude and longer in duration than an analogous closing energy impulse applied to a conventionally stiff valve body which closes on a conventional frusto-conical valve seat. The combination of lower amplitude and longer duration of the closing energy impulse results in a narrowed characteristic vibration bandwidth having reduced potential for induction of damaging resonances in the valve and adjacent portions of the pump housing.

In impulse tolerant valve body embodiments comprising at least one internal elastic variable-volume space filled with incompressible fluid, the valve body is described herein as being longitudinally compressible under a closing energy impulse. During longitudinal compression (with fluid flow from at least one variable-volume space to at least one internal surge chamber via at least one fluid flow restrictor) and the elastic rebound which follows (with fluid flow to at least one variable-volume space from at least one internal surge chamber via at least one fluid flow restrictor), a portion of the closing energy is dissipated (i.e., redistributed) as heat due to fluid flow friction losses and valve body hysteresis loss. Closing energy impulse amplitude is consequently reduced and impulse duration is increased. The closing energy impulse's characteristic vibration spectrum is thus narrowed, while induced resonance vibrations in the valve and associated pump structures are damped, thereby reducing the potential for pump damage.

In continuous pump operation, each internal variable-volume space of an impulse tolerant valve body within an impulse tolerant valve assembly of the invention is capable of repetitive elastic longitudinal compression (which reduces volume), followed by elastic rebound (which increases volume) under the influence of a series of relatively brief closing energy impulses. Cumulative energy loss in the form of heat (i.e., hysteresis loss plus fluid flow friction loss) is continuously transported for redistribution within the valve body and eventual rejection to the valve body surroundings (including, e.g., the pumped fluid).

As described herein, each variable-volume space is filled with incompressible fluid and has fluid communication, directly and/or indirectly (as, for example, via another variable-volume space), with at least one constant-volume internal surge chamber. The term "fluid communication" refers to one or more internal channels through which an incompressible fluid may flow within a valve body of the invention. Incompressible fluid flow may be, for example, from a variable-volume space to a constant-volume surge chamber, or from one variable-volume space to another variable-volume space. And at least one of the internal channels through which incompressible fluid flows comprises at least one fluid flow restrictor.

Each fluid flow restrictor causes an increase of turbulence in fluid flowing through the restrictor. Increased fluid turbulence, in turn, is associated with generation of frictional heat within the flowing fluid. This heat, which is eventually lost to the valve body generally and/or to the valve body surroundings (e.g., the pumped fluid), represents a reduction in the energy content of the closing energy impulse applied to the valve body.

Each valve body compression-rebound cycle thus causes cyclical flow of incompressible fluid to and from at least one constant-volume surge chamber through at least one flow restrictor. At least a portion of space within each surge chamber is occupied by a compressible fluid (e.g., air) for accommodating the cyclical entry and exit of incompressible fluid.

During such cyclical flow of incompressible fluid at least a portion of the closing impulse energy is redistributed as pulsatile heat losses comprising fluid flow friction losses and/or valve body hysteresis loss as noted above. Each closing energy impulse amplitude is thus reduced, with the associated impulse duration being increased (proportional to incompressible fluid flow cycle times). The results include the beneficial effects noted above. And the (localized) valve body heat pulses are at least partly scavenged (thus limiting local temperature rise) by the incompressible fluid. The heat is transferred to cooler portions of the valve body for eventual rejection to the valve body surroundings (e.g., the pumped fluid).

Note that fluid flow restrictors within an impulse tolerant valve body may be fixed or variable. If variable, the magnitude of fluid flow restriction may be a function of another variable, such as longitudinal compression. In such a case, the flow restriction is described herein as being responsive to longitudinal compression of the valve body. Fluid flow restriction may alternatively and/or additionally be manually adjustable according to predetermined criteria for optimizing valve performance.

The incompressible fluid thus absorbs and transports a first portion of closing impulse energy, which has been converted to heat via fluid friction (e.g., secondary to turbulence) in a fluid flow restrictor. The incompressible fluid also absorbs and transports a second portion of closing impulse energy, which has been converted to heat via hysteresis loss in the impulse tolerant valve body. The incompressible fluid thus transports and redistributes these first and second portions of closing impulse energy, in the form of heat, to various portions of a valve body (and ultimately to the impulse tolerant valve assembly's surroundings). To optimize heat transportation and redistribution by the incompressible fluid in particular operational environments, alteration of the incompressible fluid's parameters such as viscosity and/or thermal conductivity (e.g., by the addition of metallic nanoparticles to the fluid) may be employed.

Note that the term "incompressible fluid" herein includes relatively homogenous fluids (e.g., single-weight mineral oil or a single-species fluid polymer) as well as combination fluids containing one or more of such relatively homogenous fluids plus finely divided particulate matter (e.g., nanoparticles) and/or other dispersed species (e.g., species in colloidal suspension). See, e.g., U.S. Pat. No. 6,432,320 B1, incorporated by reference and referred to hereinafter as the '320 patent.

Note also that the impulse tolerant characteristics of a valve body operate by three interacting mechanisms. First, impulse amplitude is reduced by converting a portion of total closing impulse energy to heat, which is then ultimately rejected to the valve body surroundings (e.g., the pumped fluid).

Second, impulse duration at the valve seat is lengthened by the cycle time associated with bowl-shaped valve body flexure and elastic rebound. And impulse duration is further lengthened, in valve body embodiments having impulse-related internal fluid flow, by the cycle time associated with longitudinal valve body compression and rebound (i.e., the incompressible fluid flow cycle time). Each such reduction in closing impulse energy results in a corresponding reduction of the impulse's characteristic bandwidth (and thus reduction of the damage potential of induced vibrations).

And third, induced vibration resonances of the valve body, valve seat, and/or pump housing structures are effectively damped by interactions of the elastic valve body with pumped fluid and/or with incompressible fluid within the valve body.

And note further that the flow of incompressible fluid during a compression and rebound cycle will assist in redistributing heat away from areas of the impulse tolerant valve body which might otherwise develop hot spots due to relatively high fluid friction and/or hysteresis loss. Thus, the energy redistribution function of the valve body assists in reducing thermal stress by reducing temperature differentials across the valve body.

To increase understanding of the invention, first, second and third embodiments are discussed herein only as illustrative examples. In a first invention embodiment, an impulse tolerant valve body has a longitudinal axis and comprises at least one guide (e.g., a top guide stem), at least one peripheral seal retention groove, a convex valve seat interface, at least one internal elastic variable-volume space, at least one internal constant-volume surge chamber, and at least one external access port (e.g., a proximal central tubular port and/or a distal central tubular port). At least one internal elastic variable-volume space is in fluid communication (directly and/or indirectly) with at least one internal constant-volume surge chamber via at least one fluid flow restrictor. And at least one internal elastic variable-volume space is responsive to longitudinal compression of the valve body, each said internal elastic variable-volume space being filled with incompressible fluid (e.g., mineral oil or a liquid polymer).

The incompressible fluid may additionally comprise metallic nanoparticles comprising, for example, copper, beryllium, titanium, nickel, iron, alloys or blends thereof, and carbon. The term nanoparticle may conveniently be defined as including particles having an average size of up to about 2000 nm. See, e.g., the '320 patent. Further, at least one fluid flow restrictor may comprise longitudinally opposing proximal and distal circular bosses, thus making such a fluid flow restrictor responsive to longitudinal compression of the valve body.

In a second invention embodiment a concave valve seat is symmetrical about a longitudinal axis and comprises a distal end, a tapered outer surface extending proximally from the distal end, an external shoulder proximal to the tapered outer surface, a cylindrical inner surface extending proximally from the distal end, and a proximal contact surface. The proximal contact surface is inwardly concave for achieving circular rolling contact as described above with an impulse tolerant valve body's convex valve seat interface.

In a third invention embodiment an impulse tolerant valve body has a longitudinal axis and comprises at least one guide, at least one peripheral seal retention groove, and a convex valve seat interface. The valve body comprises carbon fiber reinforced polymer, and the polymer may comprise PAEK. In the latter case, the polymer may comprise PEEK. Such a valve body, combining high strength with flexibility and relatively light weight, demonstrates the beneficial effects described above.

The third invention embodiment impulse tolerant valve body may be combined with a concave valve seat to form an impulse tolerant valve assembly. The concave valve seat is symmetrical about a longitudinal axis and comprises a distal end, a tapered outer surface extending proximally from the distal end, an external shoulder proximal to the tapered outer surface, a cylindrical inner surface extending proximally from the distal end, and a proximal contact surface. The proximal contact surface is inwardly concave for achieving circular rolling contact with the impulse tolerant valve body's convex valve seat interface.

Note that in addition to the first, second and third example embodiments described herein, still other alternative invention embodiments exist, including valves and pumps comprising one or more of the example embodiments. For example, internal valve body spaces may be formed by welding (e.g., inertial welding or laser welding) valve body portions together as in the '837 patent, or by separately machining such spaces with separate coverings. Valve body fabrication may also be by rapid-prototyping (i.e., layer-wise) techniques. Such techniques may obviate the fluid-filling steps above by incorporating the fluid during fabrication. See, e.g., U.S. Pat. No. 7,847,057 B2, incorporated by reference.

Note also that the fluid used to fill the internal elastic variable-volume space(s) of an invention embodiment may be maintained (e.g., by temperature control) in a less viscous state during valve body filling, to be replaced by a more viscous state in a sealed valve body

DETAILED DESCRIPTION

Figure 1:
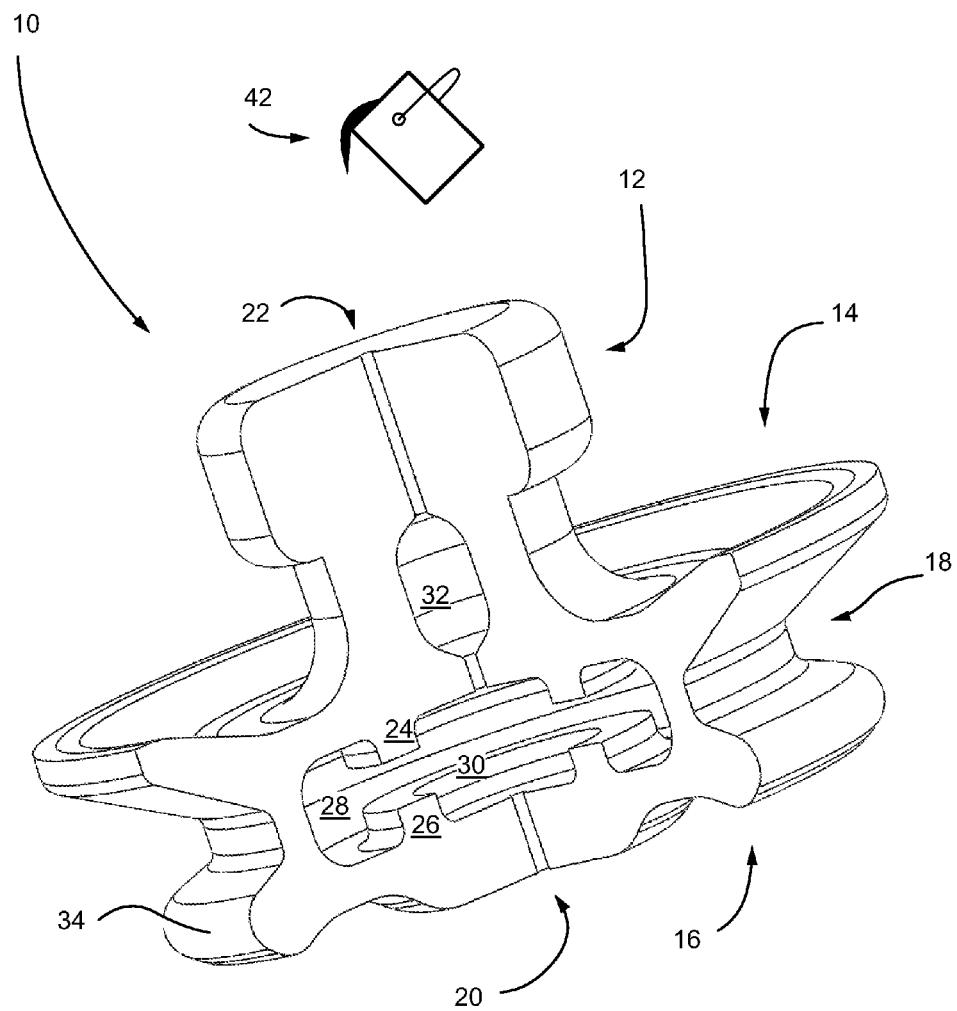
FIG. 1 is a schematic 3-dimensional partial cross-sectional view of an impulse tolerant valve body embodiment in which a fluid flow restrictor comprises longitudinally opposing circular bosses, the flow restrictor thus being responsive to longitudinal compression of the valve body.
Figure 3:
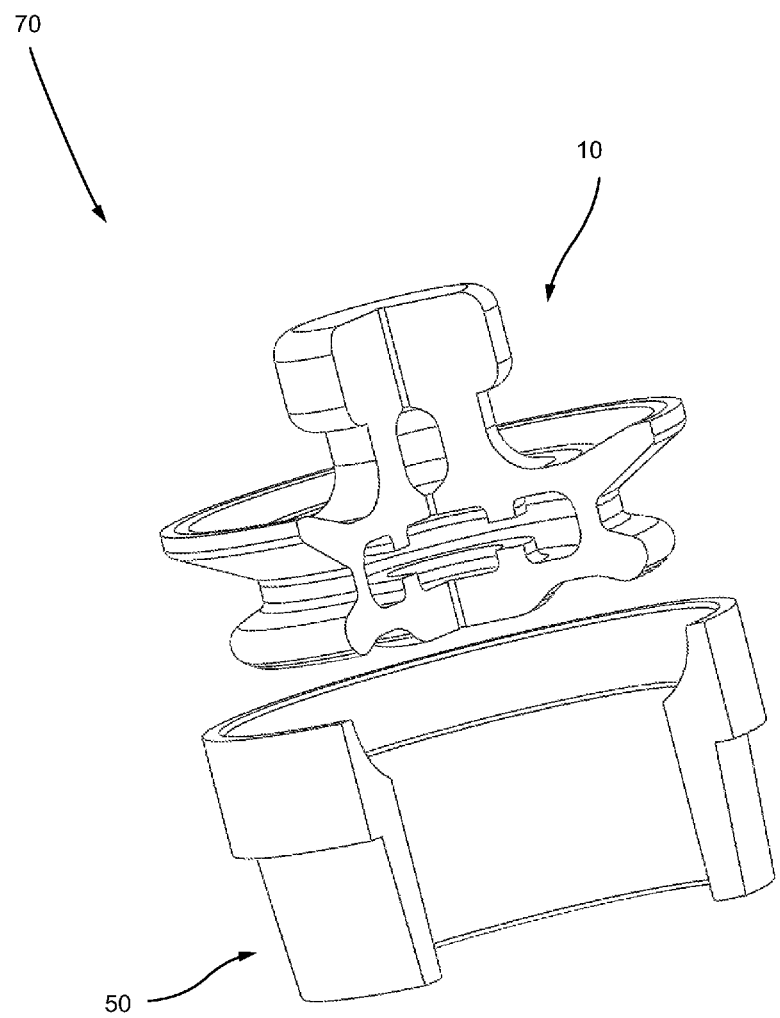
FIG. 3 is a schematic 3-dimensional partial cross-sectional exploded view of an impulse tolerant valve assembly comprising an impulse tolerant valve body and a concave valve seat. The valve body has a convex valve seat interface corresponding to the valve seat's proximal concave contact surface.

FIGS. 1 and 3 show schematic views of examples of valve body 10 of the invention, which is further described below. Note that an incompressible fluid 42 is schematically illustrated in FIG. 1 as being poured into valve body 10 via external access port 22, but not shown within valve body 10 in either FIG. 1 or 3 to avoid obscuring details of the internal structures of valve body 10 when the illustrated pouring operation is completed and internal elastic variable-volume spaces 28 and 30 are filled with incompressible fluid 42. Note also that incompressible fluid 42 may be introduced into valve body 10 via either external access port 20 or external access port 22 or both. Following the filling of elastic variable-volume spaces 28 and 30, ports 20 and 22 are plugged or sealed (e.g., by welding), thus ensuring that at least a portion of internal constant-volume surge chamber 32 is occupied by a compressible fluid (e.g., air) for accommodating the cyclical entry and exit of incompressible fluid moving between internal elastic variable-volume space 28 and/or 30 and internal constant-volume surge chamber 32.

In a first invention embodiment, a valve body 10 (see FIG. 1) has a longitudinal axis and comprises at least one guide 12. The schematically illustrated example guide 12 is a top or proximal guide stem. Other guides (not illustrated) that may be incorporated in embodiments of the invention include, but are not limited to, a bottom or distal guide stem, a crowfoot guide, or a combination of top, bottom and/or crowfoot guides. Portions of a proximal (or top) body portion 14 and a distal (or bottom) body portion 16 form a peripheral seal retention groove 18. A convex valve seat interface 34 is a portion of distal body portion 16. Internal elastic variable-volume spaces 28 and 30 each experience an elastic reduction in volume with longitudinal compression of valve body 10, with an elastic rebound (i.e., increase in volume) on removal of longitudinal compression of valve body 10. Internal elastic variable-volume spaces 28 and 30 are thus each characterized herein as responsive to longitudinal compression of valve body 10. Internal elastic variable-volume space 30 is shown in (direct) fluid communication with internal surge chamber 32, as well as external access port 22 (distal central tubular port). Internal elastic variable-volume space 28 is shown in (indirect) fluid communication with internal surge chamber 32 via fluid flow restrictors 24 and 26 (which are longitudinally opposed circular bosses) and internal elastic variable-volume space 30. As illustrated, fluid communication in embodiments of the invention may be direct and/or indirect.

Application or removal of longitudinal compression to valve body 10 will cause fluid flow restrictors 24 and 26 to alter restriction of incompressible fluid flow from or to internal elastic variable-volume space 28. Fluid flow restrictors 24 and 26 are thus each characterized herein as responsive to longitudinal compression of valve body 10.

Note that fluid flow restrictors 24 and 26 act in concert in the illustrated embodiment since they are longitudinally opposing proximal and distal circular bosses. A fluid flow restrictor in another embodiment of the invention may appear singly, and may or may not be responsive to longitudinal compression of the valve body with which it is associated. A flow restrictor which is responsive to longitudinal compression of the valve body with which it is associated facilitates adaptation of the valve body to varying pumped fluid pressures (i.e., increasing flow restriction with higher pumped fluid pressures and decreasing flow restriction with lower pumped fluid pressures).

The first embodiment's fluid 42 may comprise, e.g., mineral oil or liquid polymer to which may be added metallic nanoparticles which are generally invisible to the eye as they are typically dispersed in a colloidal suspension. Nanoparticles comprise, for example, copper, beryllium, titanium, nickel, iron, alloys or blends thereof, and carbon. The term nanoparticle may conveniently be defined as including particles having an average size of up to about 2000 nm.

Figure 2:
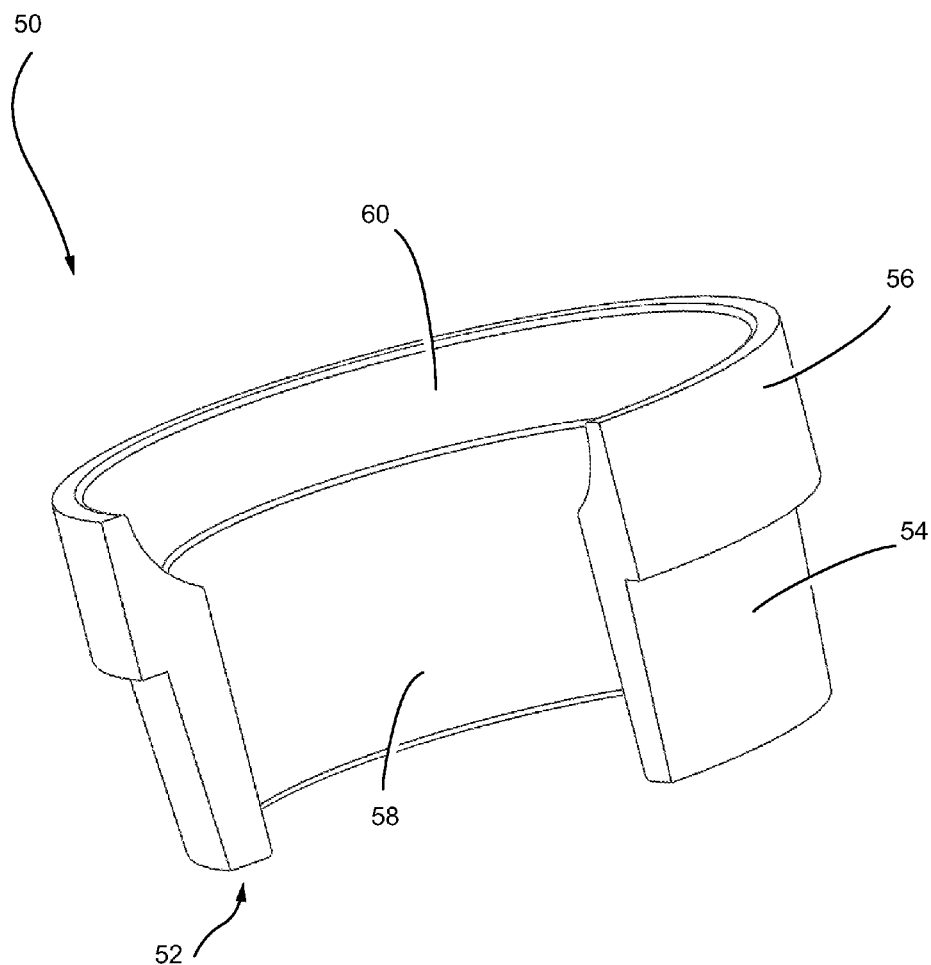
FIG. 2 is a schematic 3-dimensional partial cross-sectional view of a concave valve seat having a proximal concave contact surface.

In a second invention embodiment (see FIG. 2) a concave valve seat 50 is symmetrical about a longitudinal axis and comprises a distal end 52, a tapered outer surface 54 extending proximally from distal end 52, an external shoulder 56 proximal to tapered outer surface 54, a cylindrical inner surface 58 extending proximally from distal end 52, and a proximal contact surface 60. Proximal contact surface 60 is inwardly concave for achieving circular rolling contact with an impulse tolerant valve body's convex valve seat interface.

In a third invention embodiment an impulse tolerant valve body 10 (see, e.g., FIG. 1) has a longitudinal axis and comprises at least one guide, at least one peripheral seal retention groove, and a convex valve seat interface. The valve body comprises carbon fiber reinforced polymer, and the polymer may comprise PAEK. In the latter case, the polymer may comprise PEEK.

The third invention embodiment impulse tolerant valve body may be combined with a concave valve seat 50 (see, e.g. FIG. 2) to form an impulse tolerant valve assembly 70 (see FIG. 3). Concave valve seat 50 is symmetrical about a longitudinal axis and comprises a distal end 52, a tapered outer surface 54 extending proximally from distal end 52, an external shoulder 56 proximal to tapered outer surface 54, a cylindrical inner surface 58 extending proximally from distal end 52, and a proximal contact surface 60. Proximal contact surface 60 is inwardly concave for achieving circular rolling contact with the impulse tolerant valve body's convex valve seat interface 34.

What is claimed is:

1. An impulse tolerant valve body, said valve body having a longitudinal axis and comprising at least one guide, at least one peripheral seal retention groove, a convex valve seat interface, at least one internal elastic variable-volume space, at least one internal constant-volume surge chamber, and at least one external access port;

wherein at least one said internal elastic variable-volume space is in fluid communication with at least one said internal constant-volume surge chamber via at least one fluid flow restrictor;

wherein at least one said internal elastic variable-volume space is responsive to longitudinal compression of said valve body; and wherein each said internal elastic variable-volume space is filled with incompressible fluid comprising mineral oil.

2. An impulse tolerant valve body, said valve body having a longitudinal axis and comprising at least one guide, at least one peripheral seal retention groove, a convex valve seat interface, at least one internal elastic variable-volume space, at least one internal constant-volume surge chamber, and at least one external access port;

wherein at least one said internal elastic variable-volume space is in fluid communication with at least one said internal constant-volume surge chamber via at least one fluid flow restrictor;

wherein at least one said internal elastic variable-volume space is responsive to longitudinal compression of said valve body; and wherein each said internal elastic variable-volume space is filled with incompressible fluid comprising mineral oil and nanoparticles.

3. An impulse tolerant valve body, said valve body having a longitudinal axis and comprising at least one guide, at least one peripheral seal retention groove, a convex valve seat interface, at least one internal elastic variable-volume space, at least one internal constant-volume surge chamber, and at least one external access port;

wherein at least one said internal elastic variable-volume space is in fluid communication with at least one said internal constant-volume surge chamber via at least one fluid flow restrictor;

wherein at least one said internal elastic variable-volume space is responsive to longitudinal compression of said valve body; and wherein each said internal elastic variable-volume space is filled with incompressible fluid comprising mineral oil and metallic nanoparticles having an average size of up to about 2000 nm.

4. An impulse tolerant valve body, said valve body having a longitudinal axis and comprising at least one guide, at least one peripheral seal retention groove, a convex valve seat interface, at least one internal elastic variable-volume space, at least one internal constant-volume surge chamber, and at least one external access port, said at least one external access port comprising a proximal central tubular port and a distal central tubular port;

wherein at least one said internal elastic variable-volume space is in fluid communication with at least one said internal constant-volume surge chamber via at least one fluid flow restrictor;

wherein at least one said internal elastic variable-volume space is responsive to longitudinal compression of said valve body; and wherein each said internal elastic variable-volume space is filled with incompressible fluid.

5. An impulse tolerant valve body, said valve body having a longitudinal axis and comprising at least one guide, at least one peripheral seal retention groove, a convex valve seat interface, at least one internal elastic variable-volume space, at least one internal constant-volume surge chamber, and at least one external access port;

wherein at least one said internal elastic variable-volume space is in fluid communication with at least one said internal constant-volume surge chamber via at least one fluid flow restrictor;

wherein at least one said fluid flow restrictor comprises longitudinally opposing proximal and distal circular bosses;

wherein at least one said internal elastic variable-volume space is responsive to longitudinal compression of said valve body; and wherein each said internal elastic variable-volume space is filled with incompressible fluid.

6. A pump comprising at least one valve, said valve comprising an impulse tolerant valve body, said valve body having a longitudinal axis and comprising at least one guide, at least one peripheral seal retention groove, a convex valve seat interface, at least one internal elastic variable-volume space, at least one internal constant-volume surge chamber, and at least one external access port;

wherein at least one said internal elastic variable-volume space is in fluid communication with at least one said internal constant-volume surge chamber via at least one fluid flow restrictor;

wherein at least one said internal elastic variable-volume space is responsive to longitudinal compression of said valve body; and wherein each said internal elastic variable-volume space is filled with incompressible fluid.

\* \* \* \* \*